United States Patent
Fu et al.

(10) Patent No.: US 8,792,335 B2
(45) Date of Patent: Jul. 29, 2014

(54) METHOD FOR SHARING PROTECTION OF MESH NETWORK PROTECTION FIELD AND SYSTEM THEREOF

(75) Inventors: Sen Fu, Shenzhen (CN); Jun Dong, Shenzhen (CN); Chunxing Yao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 155 days.

(21) Appl. No.: 13/575,227

(22) PCT Filed: Apr. 22, 2010

(86) PCT No.: PCT/CN2010/072080
§ 371 (c)(1),
(2), (4) Date: Jul. 25, 2012

(87) PCT Pub. No.: WO2011/091627
PCT Pub. Date: Aug. 4, 2011

(65) Prior Publication Data
US 2012/0300619 A1 Nov. 29, 2012

(30) Foreign Application Priority Data

Feb. 1, 2010 (CN) .......................... 2010 1 0112479

(51) Int. Cl.
*H04L 12/26* (2006.01)
*H04L 12/437* (2006.01)
*H04L 12/56* (2006.01)
*H04L 12/24* (2006.01)
*H04L 12/42* (2006.01)

(52) U.S. Cl.
CPC ........... *H04L 12/437* (2013.01); *H04L 41/0659* (2013.01); *H04L 12/42* (2013.01); *H04L 41/0654* (2013.01); *H04L 45/22* (2013.01); *H04L 45/28* (2013.01)
USPC ........................... 370/222; 370/216; 370/221

(58) Field of Classification Search
CPC . H04L 41/06; H04L 41/0604; H04L 41/0654; H04L 41/0659; H04L 41/0681; H04L 41/069
USPC .......................................... 370/216, 221, 222
See application file for complete search history.

(56) References Cited

U.S. PATENT DOCUMENTS

| 8,593,941 | B2 * | 11/2013 | Dong et al. ................... 370/217 |
| 2004/0088429 | A1 * | 5/2004 | Luo ................ 709/232 |
| 2006/0164996 | A1 * | 7/2006 | Meguerditchian ............ 370/241 |

(Continued)

FOREIGN PATENT DOCUMENTS

| CN | 1661984 A | 8/2005 |
| CN | 1694418 A | 11/2005 |
| WO | WO-2008/053465 | 5/2008 |

OTHER PUBLICATIONS

PCT International Search Report dated Nov. 25, 2010 for PCT/CN2010/072080.

*Primary Examiner* — Farah Faroul
(74) *Attorney, Agent, or Firm* — Foley & Lardner LLP

(57) ABSTRACT

A method and system for sharing protection of a mesh network protection domain are disclosed by the present invention. The method includes: presetting a protection ring in the mesh network protection domain, a path of the protection ring running through source and destination nodes of a plurality of services in the mesh network protection domain, and only reserving protection resources on the path of the protection ring; determining protection methods used respectively by a plurality of services said above and configuring a corresponding protection group; setting protection paths of all protection groups on the protection ring, and sharing the protection resources of the protection ring.

17 Claims, 9 Drawing Sheets

(56) References Cited

U.S. PATENT DOCUMENTS

2007/0274207 A1* 11/2007 Li ................................ 370/222
2007/0280251 A1* 12/2007 Wang et al. ................ 370/395.1
2009/0129772 A1* 5/2009 Trudel et al. ...................... 398/8
2010/0278040 A1* 11/2010 He et al. ......................... 370/222
2013/0064073 A1* 3/2013 Cheng et al. ................... 370/225
2013/0194913 A1* 8/2013 Sun et al. ....................... 370/223

* cited by examiner

METHOD FOR SHARING PROTECTION OF MESH NETWORK PROTECTION FIELD AND SYSTEM THEREOF

TECHNICAL FIELD

The present invention relates to the field of communication transmission, and in particular, to a method and system for sharing protection of a mesh network protection domain.

BACKGROUND OF THE RELATED ART

The data transmission network is developing towards the direction that there are more and more nodes and the topology is increasingly complicated. The mesh network has already become the process that will be gone through certainly in the development of the network, such as the Optical Transport Network (abbreviated as the OTN), the Packet Transport Network (abbreviated as the PTN), the Synchronous Digital Hierarchy (abbreviated as the SDH), etc. And in the traditional SDH, the Wavelength Division Multiplexing (abbreviated as the WDM) and the OTN network, it can only generally provide the following protection method to the network survivability: link 1+1 protection, M:N protection, ring sharing protection and intelligent mesh network recovery through the control plane, and these protection methods all have the corresponding protection protocols.

These schemes all have a typical shortcoming, for example, the link 1+1 protection has the data transmission on both the working path and the protection path of the protection group, and it is an exclusive protection method, wherein the utilization rate of the network resource is very low, the maximum utilization rate is 50%, and usually it can only be up to 40%. The protection path of the M:N protection and the ring sharing protection can be shared, wherein the ring sharing protection is the sharing of the path topology in the ring topology, but the maximum utilization rate of its network resource can only be up to 50%; the resource utilization rate of the M:N protection is very high, but the protected link and the source and destination nodes of the protection link are required to be coincident, which restricts the flexibility of the configuration, and one special case of the M:N protection is the 1:1 protection; the intelligent Mesh recovery is that the available resource is calculated dynamically by the control plane after the service is damaged, and the resource utilization rate is higher and can exceed 50%, but the time of the intelligent Mesh recovery is usually in one hundred millisecond grade, which is unable to meet the requirement of 50 milliseconds in the transmission field.

FIG. 1 shows a typical network topology of the Mesh, and the nodes (indicated as the APS node in the figure) with the function of the Automatic Protection Switching (abbreviated as APS) connect with each other through a plurality of paths. If the protection resource is reserved in the links of the whole network as the sharing protection path, as shown in FIG. 2, the protection path is indicated by the P-path in the figure, then the method for sharing protection will be unusually complicated on one hand, and on the other hand, the resource utilization rate of the network can only be up to 50%.

SUMMARY OF THE INVENTION

The objective of the present invention is to provide a method and system for sharing protection of a mesh network protection domain, which can improve the utilization rate of the network resources.

In order to achieve the above-mentioned objective, the present invention provides a method for sharing protection of a mesh network protection domain, comprising:

presetting a protection ring in the mesh network protection domain, a path of the protection ring running through source and destination nodes of a plurality of services in the mesh network protection domain, and only reserving protection resources in a path of the protection ring; and determining protection methods used respectively by a plurality of services said above and configuring a corresponding protection group; setting protection paths of all the protection groups on the protection ring.

Furthermore, when presetting the protection ring in the mesh network protection domain, one loop where there are most services of which source and destination nodes are run through is determined as the path of the protection ring.

Furthermore, when determining protection methods used respectively by a plurality of services said above and configuring the corresponding protection group, a ring sharing protection method is used for a ring service of which working paths are all on the protection ring, and one ring sharing protection group is configured for all ring services, and that protection ring is regarded as the protection path of the ring sharing protection group; or when determining protection methods used respectively by a plurality of services said above and configuring the corresponding protection group, a 1:1 protection method is used for a ring service of which working paths are all on the protection ring, one 1:1 protection group is configured for every one ring service, and a section of path of the protection ring different from the working path of the ring service between the source and destination nodes of the ring service is regarded as the protection path.

Furthermore, when determining protection methods used respectively by a plurality of services said above and configuring the corresponding protection group, 1:1 or 2:1 protection method is used for a string service of which the source and destination nodes are on the protection ring but not all working paths are on the protection ring, one or two 1:1 protection groups are configured for every string service, and one or two sections of paths of the protection ring between the source and destination nodes of the string service is regarded as the protection path.

Furthermore, the string service comprises at least one of the following services: a single string service, referring to a string service of which the source and destination nodes are on the protection ring while all the working paths are not on the protection ring, wherein the single string service uses a 1:1 or 2:1 protection method; a multi-string service, referring to a string service of which the source and destination nodes and a relay node are all on the protection ring while all the working paths are not on the protection ring, wherein the multi-string service uses a 1:1 or 2:1 protection method; and an across-ring string service, referring to a string service of which the source and destination nodes are on the protection ring while a part of the working paths are on the protection ring and another part of the working paths are not on the protection ring, wherein the across-ring string service uses a 1:1 protection method.

Furthermore, when the mesh network protection domain is faulted and causes that a service is impaired in a plurality of services said above, if the protection path of the impaired service is not occupied by other services, a switching processing is performed according to the protection method used by the service; otherwise, alarm information of the fault is recorded, and when the protection path of the impaired service turns to be idle, if the fault hasn't disappeared yet, then the switching processing is performed according to the protection method used by the service; if the fault has already disappeared, then the alarm information of the fault is released.

Furthermore, when configuring the corresponding protection group for a plurality of services said above, a mutual suppressing relationship is configured between various protection groups according to the following way: for every protection group, if there is other protection group which is at least partly coincident with the protection path of the protection group, then other protection group said above is recorded as a protection group suppressed by the protection group; and all configured protection groups and information of the mutual suppressing relationship between various protection groups are synchronized to all protection control nodes in the mesh network protection domain, and an initial state of each protection group is marked as an inactive state.

Furthermore, when the mesh network protection domain is faulted, a process flow of triggering comprises: after the protection control node in the mesh network protection domain detects a fault alarm, finding the protection group of service impaired because of the fault, and judging whether the protection group is currently in a suppressed state: if yes, the protection control node recording alarm information of the fault, and performing suppressing on the fault alarm; and if not, switching the service to the protection path of one protection group which is not suppressed according to the protection method used by the service, and after the switching is finished, the protection control node updating a state of the protection group as an active state, updating a state of the protection group suppressed by the protection group as a suppressed state, and synchronizing the updated state of each protection group to other protection control nodes in the mesh network protection domain.

Furthermore, when the fault of the mesh network protection domain disappears, a process flow of triggering comprises: after the protection control node in the mesh network protection domain detects that the fault disappears, finding the protection group of the service impaired because of the fault, and judging whether the protection group is currently in the suppressed state: if yes, the protection control node updating the state of the protection group as the inactive state, releasing the alarm information of the fault which is recorded previously, and synchronizing the updated state of the protection group to other protection control nodes in the mesh network protection domain; and if not, there being one protection group which is in the active state in the protection group, and switching the service to the working path according to the protection method used by the service, and after the switching is finished, the protection control node updating states of the protection group in the active state and a protection group suppressed by the protection group in the protection group as the inactive state, and synchronizing the updated state of each protection group to other protection control nodes in the mesh network protection domain.

Furthermore, in the process flow of triggering the fault disappearance in the mesh network protection domain, if at least one of the protection groups of the services impaired due to the fault is in the active state, the protection control node which detects the fault disappearance, after the service is switched to the working path, judges whether the protection group which is suppressed previously has an associated suppressed fault alarm; if yes, the protection control node activates one suppressed fault alarm, and the processing is performed according to the same way when the fault alarm is detected.

In order to achieve the above-mentioned objective, the present invention further provides a system for sharing protection of a mesh network protection domain, comprising a management plane of the mesh network protection domain and various protection control nodes, characterized in that the management plane is configured to preset a protection ring in the mesh network protection domain, determine one loop where there are most services of which source and destination nodes are run through as a path of the protection ring, and only reserve protection resources in the path of the protection ring; and the protection control node comprises a configuration module, configured to configure a protection method used by the service of which the source and destination nodes are run through by the protection ring and a corresponding protection group, and set protection paths of all the protection groups on the protection ring.

Furthermore, the protection control node further comprises: a fault alarm processing module, configured to find the protection group of a service impaired because of a fault when detecting a fault alarm, switch the service to a protection path which is not occupied of the protection group, or suppress the fault alarm; and a fault disappearance processing module, configured to find the protection group of the service impaired because of the fault when detecting that fault disappears, switch the service which has been switched to the protection path back to an working path, or release the suppressed fault alarm of the fault.

Furthermore, the configuration module is configured to configure and use a ring sharing protection method for a ring service of which working paths are all on the protection ring, configure one ring sharing protection group for all ring services, and regard the protection ring as the protection path of the ring sharing protection group; configure and use the 1:1 or 2:1 protection method for a string service of which the source and destination nodes are on the protection ring but not all working paths are on the protection ring, configure one or two 1:1 protection groups for every string service, and regard one or two sections of paths of the protection ring between the source and destination nodes of the string service as the protection path.

Furthermore, the configuration module is configured to store all protection groups configured for the service of which the source and destination nodes are run through by the protection ring, for every protection group, if there is other protection group which is at least partly coincident with the protection path of the protection group, then record other protection group said above as a protection group suppressed by the protection group, and mark an initial state of each protection group as an inactive state;

the fault alarm processing module is configured to detect the fault alarm, and after finding the protection group of the service impaired because of the fault, judge whether the protection group is currently in a suppressed state; if yes, then record alarm information of the fault; if not, switch the service to the protection path of one protection group which is not suppressed according to the protection method used by the service, and after the switching is finished, update a state of the protection group as an active state, update a state of the protection group suppressed by the protection group as a suppressed state, and synchronize a updated state of each protection group to other protection control nodes in the mesh network protection domain; and the fault disappearance processing module is configured to detect that a fault disappears, and after finding the protection group of the service impaired because of the fault, if the protection group is currently in the suppressed state, update the state of the protection group as the inactive state, release the alarm information of the fault which is recorded previously, and synchronize the updated state of the protection group to other protection control nodes in the mesh network protection domain; or else, switch the service to the working path according to the protection method used by the service, and after the switching is finished, update the states of the protection group in the active state and a protection group suppressed by the protection group in the protection groups as the inactive state, and synchronize the updated state of each protection group to other protection control nodes.

Furthermore, the fault disappearance processing module is further configured to, after the service is switched to the working path, judge whether the protection group which is suppressed previously has an associated suppressed fault alarm; if yes, then activate one suppressed fault alarm, and perform processing according to the same way when the fault alarm is detected.

The above-mentioned method and system for sharing protection, through the protection ring being preset in the mesh network and each service of the source and destination nodes on the protection ring using the protection method of which the protection path can be shared, shares the reserved protection resources on the protection ring, and improves the utilization rate of the network resource. For the mesh network with n nodes, the maximum utilization rate of the network is $(N-1)/(N+1)$.

PREFERRED EMBODIMENTS OF THE PRESENT INVENTION

Hereinafter, the embodiments of the present invention are further described in detail combining with the accompanying drawings.

Figure 1:
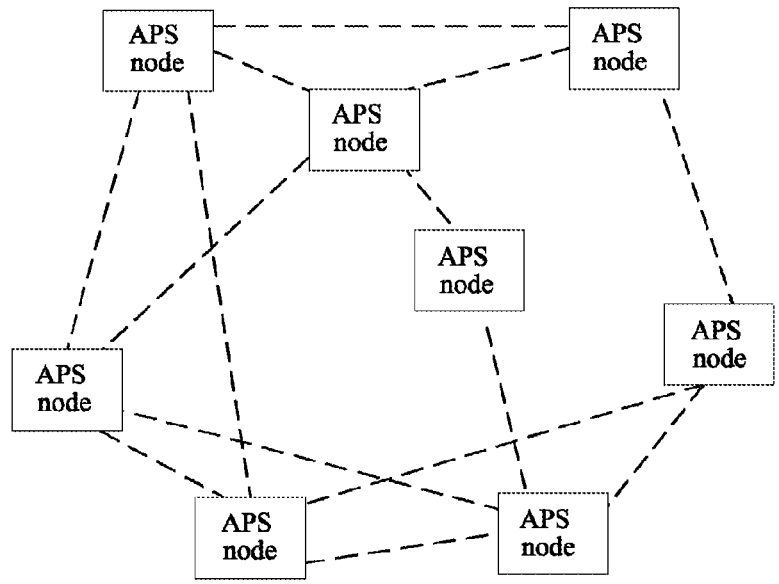
FIG. 1 is a diagram of a mesh network topology according to the related art.
Figure 2:
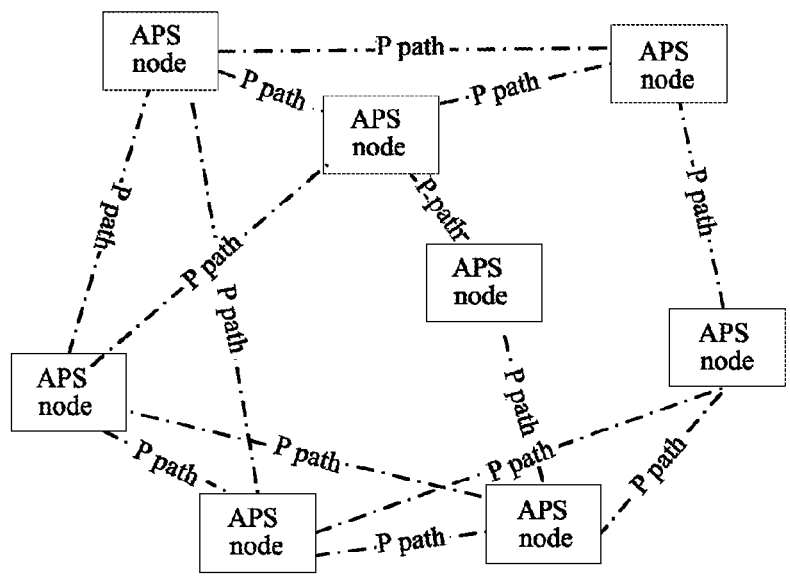
FIG. 2 is a schematic diagram of a sharing protection method of a mesh network which reserves protection resources at the whole network link according to the related art.
Figure 3:
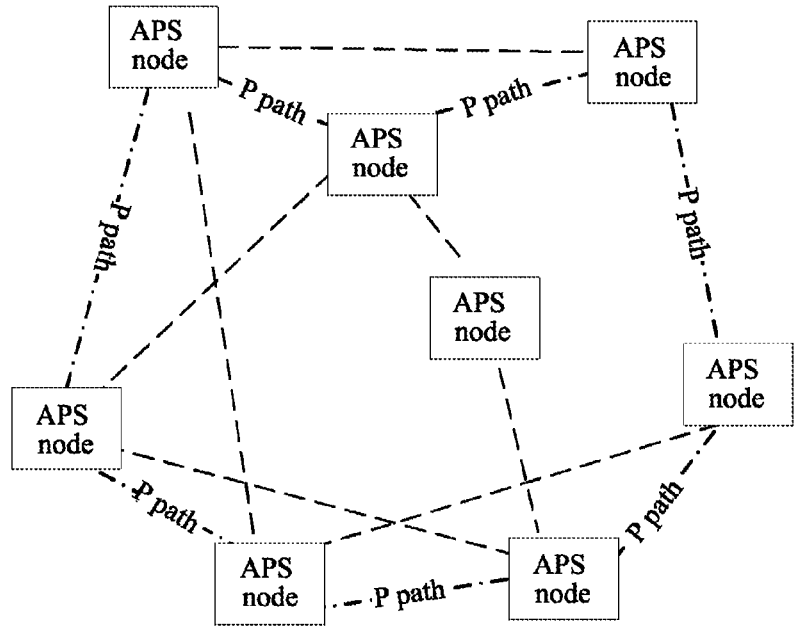
FIG. 3 is a schematic diagram of a sharing protection method of a mesh network which presets a protection ring according to an embodiment of the present invention.
Figure 5:
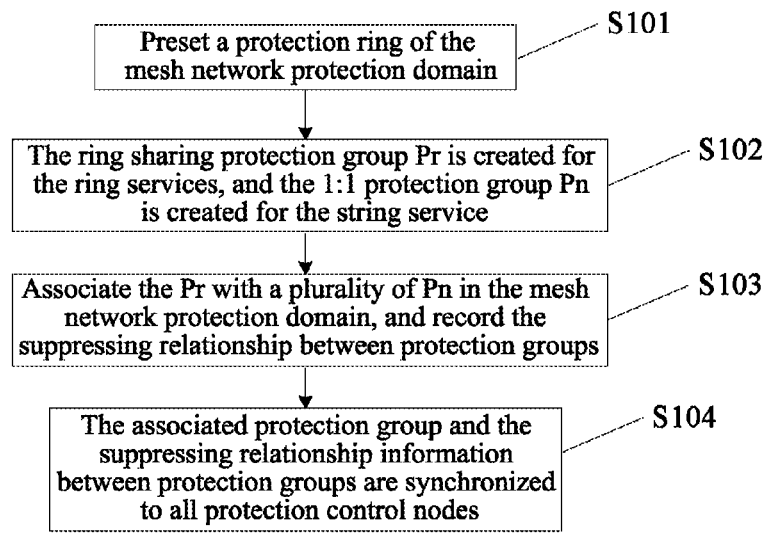
FIG. 5 is a flow chart of establishing a protection ring and a protection group according to embodiment one of the present invention.

Embodiment One the method for sharing protection of the embodiment presets a protection ring in the mesh network protection domain at first, and establishes a protection group for each service. The specific procedure is shown in FIG. 5, including the following steps:

in step S101: a protection ring is preset in the mesh network protection domain, the protection ring runs through the source and destination nodes of a plurality of services in the mesh network protection domain, and protection resources are reserved only in the path of the protection ring;

when presetting the protection ring, one loop with the most services of which the source and destination nodes are run through is generally regarded as the path of the protection ring, to provide the sharing protection to services as many as possible, and that operation can be performed in a management plane. As an example, FIG. 3 shows the path of the preset protection ring in the network topology shown in FIG. 2. The number of the nodes is not greater than 16, however, the present invention is not limited herein.

Figure 4:
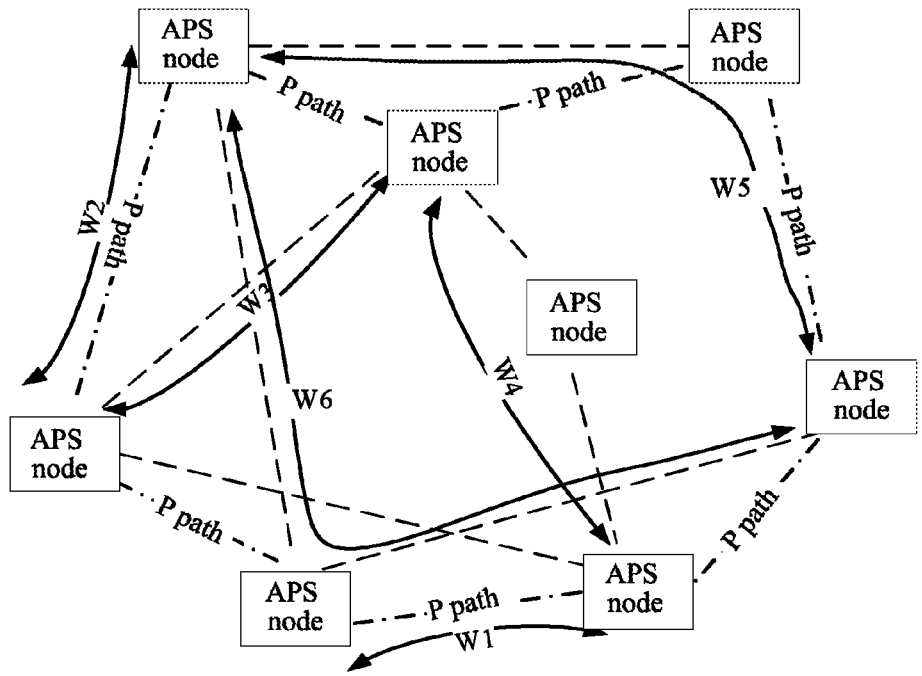
FIG. 4 is a schematic diagram of an example configuring a service in the mesh network shown in FIG. 3.

In step S102: one ring sharing protection group Pr is configured for all ring services, and one 1:1 protection group Pn is configured for every string service;

FIG. 4 shows the situation of performing the service configuration in the mesh network protection domain shown in FIG. 3. Only one service is configured in the same section of path. According to the topology relation of the working path and protection ring, the service can be classified as the ring service of which all working paths are on the protection ring, such as W1 and W2 in FIG. 4; and the string service of which the source and destination nodes are on the protection ring while not all working paths are on the protection ring. The string service can be further classified as a single string service, a multi-string service and across-ring string service, wherein:

the single string service refers to a string service of which the source and destination nodes are on the protection ring while all the working paths are not on the protection ring, such as W3 and W4 shown in FIG. 4;

the across-ring string service refers to a string service of which the source and destination nodes are on the protection ring and a part of the working paths are on the protection ring and another part of the working paths are not on the protection ring, such as W5 in FIG. 4;

the multi-string service refers to a string service of which the source and destination nodes and a relay node are all on the protection ring while all the working paths are not on the protection ring, such as W6 in FIG. 4.

In the present embodiment, the ring service uses the ring sharing protection method, and one ring sharing protection group Pr is configured for all ring services, and the whole path of the protection ring is regarded as the protection path; the string service uses the 1:1 protection method, and the 1:1 protection group Pn is configured for every string service, and a section of path between the source and destination nodes of that string service on the protection ring is regarded as the protection path.

In step S103: the ring sharing protection group Pr and all 1:1 protection groups Pn of the mesh network protection domain are associated, and the suppressing relationship between various protection groups of the mesh network protection domain is recorded;

since the protection path can only provide services for one service at one time, there is the mutual suppressing relationship between two protection groups of which the protection paths are at least partly coincident;

the present embodiment records each associated protection group of the mesh network protection domain and other protection groups suppressed by each protection group in a table through establishing the protection group suppressing relationship table. The above-mentioned "the protection paths are at least partly coincident" does not include the situation that only nodes are same.

In step S104: each associated protection group and information of the mutual suppressing relationship between various protection groups are synchronized to all protection control nodes in the mesh network protection domain.

The above-mentioned protection control node refers to the node supporting the automatic protection switching function, and the source and destination nodes of the service need to be the protection control nodes, and other nodes don't have to be the protection control nodes. The related configuration, such as the suppressing relationship between protection groups and the protection group and so on, can be performed in the management plane of the mesh network protection domain, and also can be performed in the protection control node, or performed in other way, which does not need to be limited.

When the single fault takes place in the mesh network protection domain (there is only one fault at one time) which causes the service to be impaired, if the service is a ring service, the switching processing is performed according to the ring sharing protection method; if the service is a string service, the switching processing is performed according to the 1:1 protection method.

The first fault takes place in the mesh network protection domain, and after the switching processing is performed on the first impaired service, if the second fault takes place before the first fault disappears, causing the second service to be impaired, then the switching processing is performed on the second service when the protection path of the second service is not coincident with the protection path of the first service, otherwise the alarm information of the second fault is record; if the second fault has not disappeared yet when the first fault disappears, the switching processing is performed on the second service.

Figure 6:
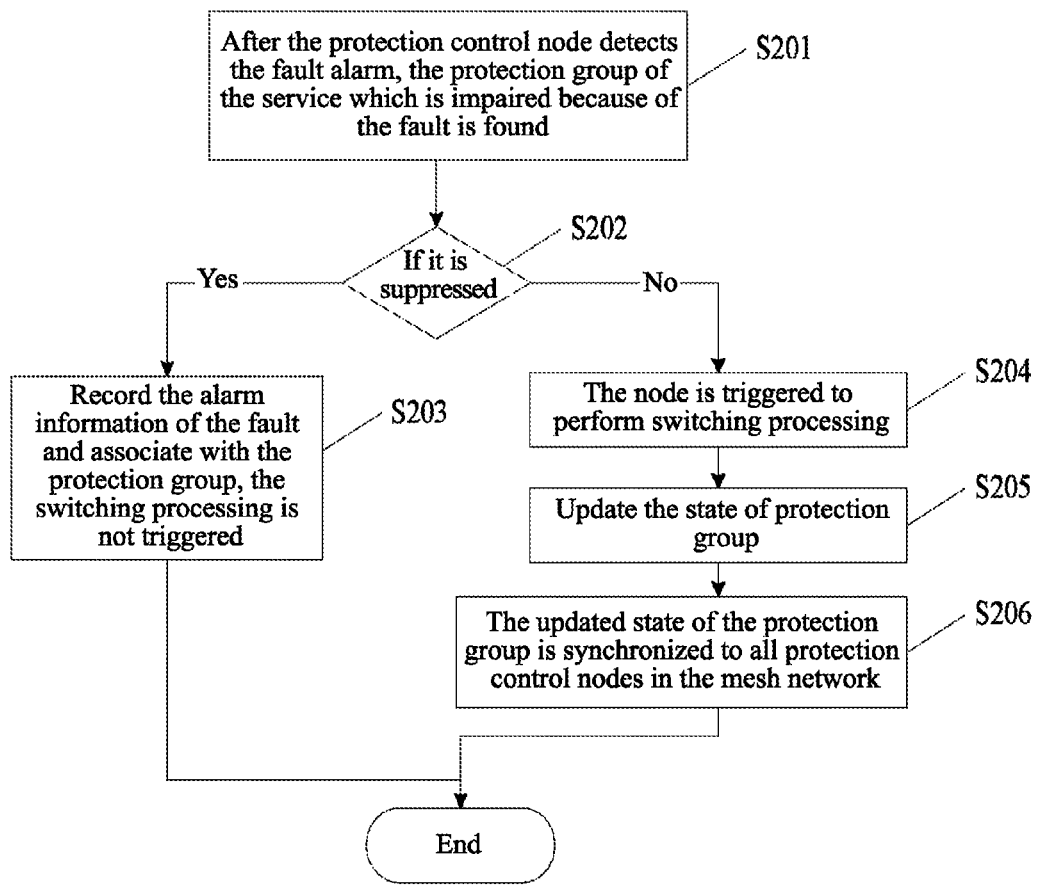
FIG. 6 is a flow chart of triggering a switching processing when detecting a fault alarm according to embodiment one of the present invention.

When it is faulted, the protection control node detecting the fault alarm will trigger the following processing flow, as shown in FIG. 6:

in step S201: after the protection control node detects the fault alarm, the protection group and the suppressing relationship information stored locally is queried, and the protection group of the service which is impaired due to the fault is found;

in step S202: it is judged whether the protection group is currently in the suppressed state; if yes, step S203 is executed, if not, step S204 is executed;

each protection group has one initial state, which can be marked as the inactive state, and the state of the related protection group will be updated when detecting the fault alarm and the fault disappearance, and the details are as follows.

In step S203: the protection control node records the alarm information of the fault and is associated with the protection group, that is, the fault alarm is suppressed, and the switching processing is not triggered, and the flow ends;

in one example, the fault alarm information can be added to the record where the protection group locates in the protection group suppressing relationship table.

In step S204: the switching processing is performed according to the protection method used by the service which is impaired because of the fault, and the service is switched to the protection path;

in the above-mentioned switching processing, except the protection control node detecting the fault alarm, it may involve other nodes. The switching processing of these nodes is already defined in the protocol, and it will no longer go into details here, and the switching processing detecting the fault disappearance is same.

In step S205: after the switching is finished, the protection control node updates the state of the protection group as the active state, and update the state of other protection groups suppressed by the protection group as the suppressed state;

in step S206: the protection control node synchronizes the updated state of each protection group to other protection control nodes in the mesh network protection domain.

In one example, the protection control node directly synchronizes the updated protection group suppressing relationship table to each protection control node in the mesh network protection domain.

The node detecting the fault alarm and fault disappearance can be the source and/or destination node of the string service of which the working path passes the fault point, and also can be the node of the protection ring on one side or two sides of the fault point.

Figure 7:
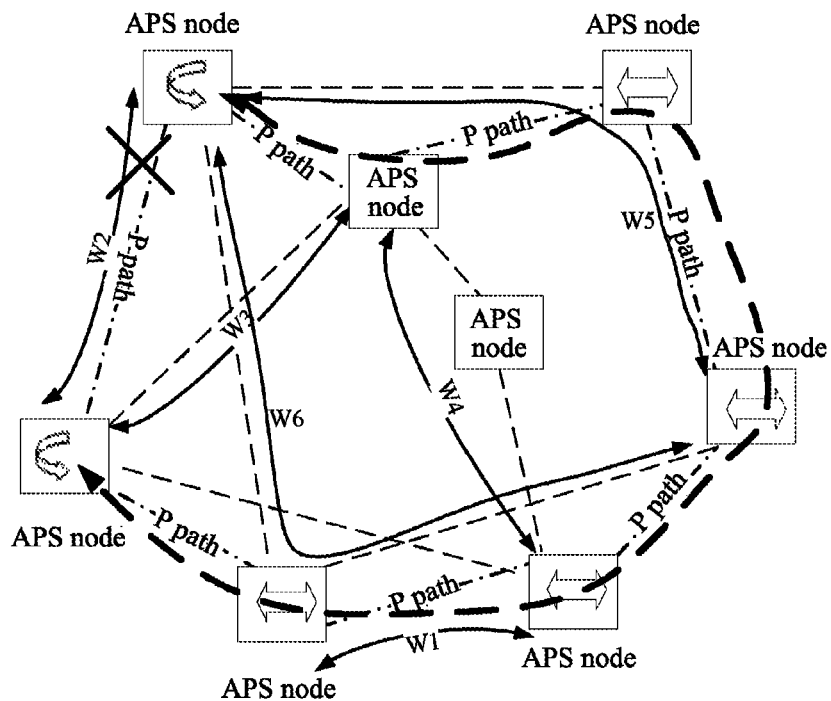
FIG. 7~FIG. 12 are respectively schematic diagrams of an example of performing a switching processing when a fault causes one or a plurality of services to be impaired.

Now taking the network topology and configuration in FIG. 4 as an example, several examples of the service switching when the fault causes the service to be impaired are given:

The single fault causes the ring service W2 to be impaired, and the switching processing is performed according to the ring sharing protection method, as shown in FIG. 7, and the path after switching is shown as bold line in the figure. The node filled with "⇐" in the figure represents the node performing the switching; the node filled with "⇔" represents a straight-through node of the service after switching, and the "×" represents the fault point, and other figures are same with here.

Figure 8:
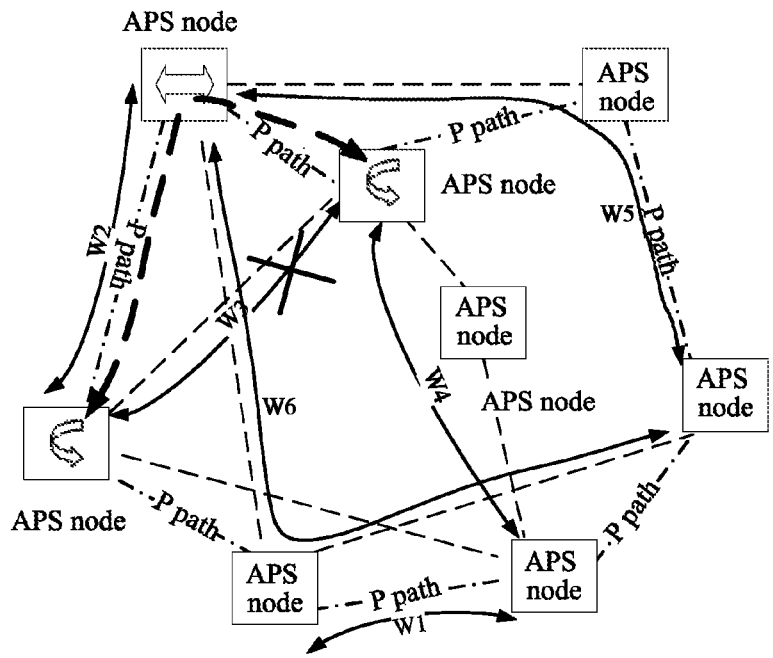

The single fault causes the string service W3 to be impaired, and the service is switched to the preset protection path according to the 1:1 protection method, shown as the bold line in FIG. 8.

Figure 9:
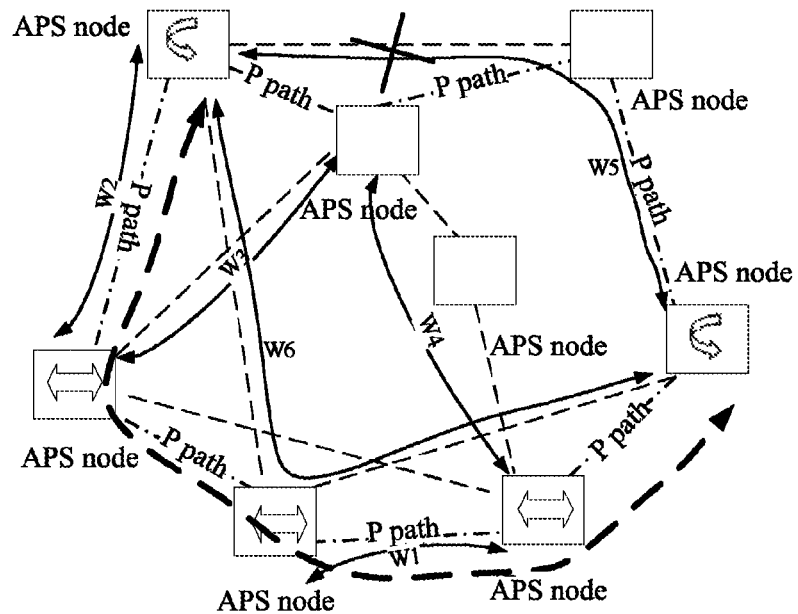

The single fault causes the string service W5 to be impaired, and the service is switched to the preset protection path according to the 1:1 protection method, shown as the bold line in FIG. 9.

Figure 10:
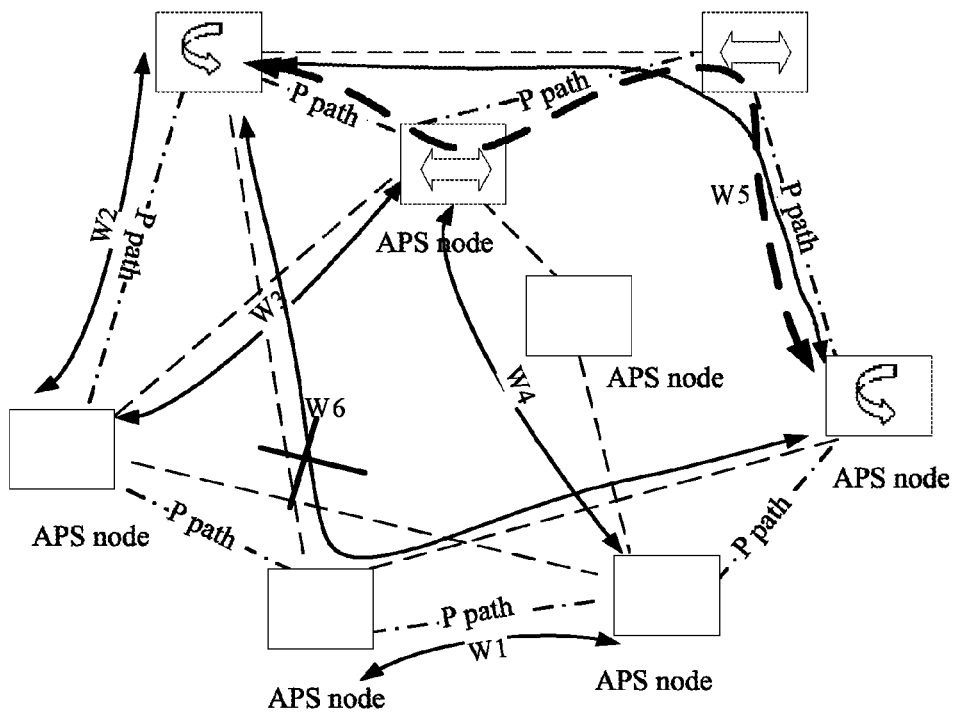

The single fault causes the string service W6 to be impaired, and the service is switched to the preset protection path according to the 1:1 protection method, shown as the bold line in FIG. 10.

Figure 11:
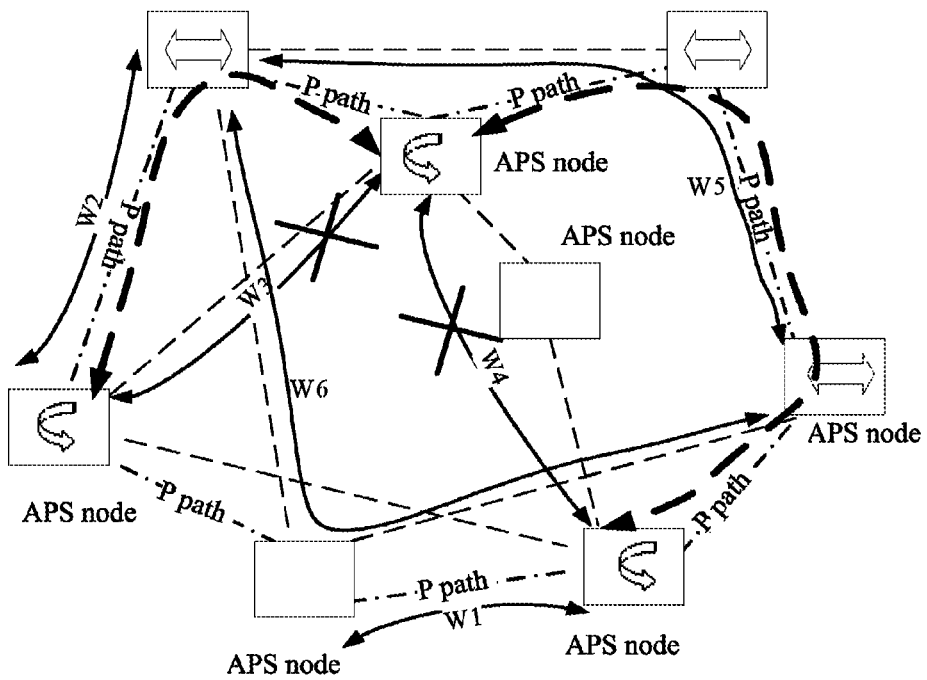

The multiple faults cause the string services W3 and W4 to be impaired, and since there is no mutual suppressing relationship between the two string services, the services are respectively switched to their respective preset protection path according to the 1:1 protection method, shown as the bold line in FIG. 11.

Figure 12:
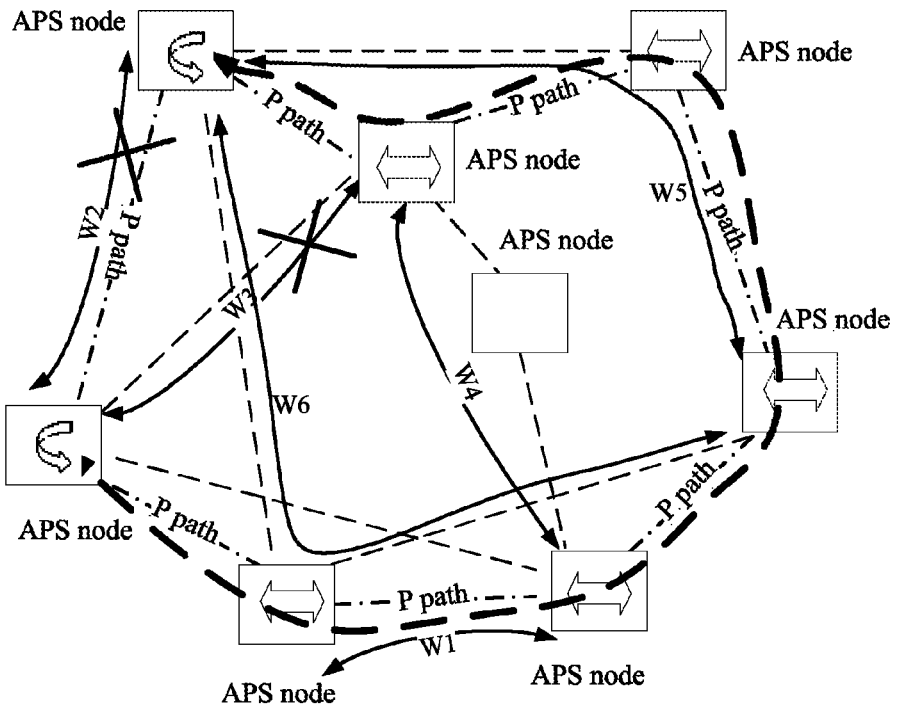

The first fault causes the ring service W2 to be impaired, and the protection control node detecting the fault alarm switches the service to the preset ring protection path according to the ring protection method, shown as the bold line in FIG. 12, and it also can update the state of the ring sharing protection group Pr as the active state and set the state of the protection group which has the mutual suppressing relationship with the Pr (including the 1:1 protection group of the string service W3) as the suppressed state, and synchronize the updated protection group suppressing relationship table to other protection control nodes in the protection domain.

If the second fault takes place and causes the string service W3 to be impaired before the first fault disappears, at this moment, the protection control node detecting the fault alarm will search for the local protection group and its suppressing relationship information and find the 1:1 protection group of the string service W3; if the protection group is found in the suppressed state, the alarm information of the second fault will be recorded, and the switching processing is not triggered temporarily.

Figure 13:
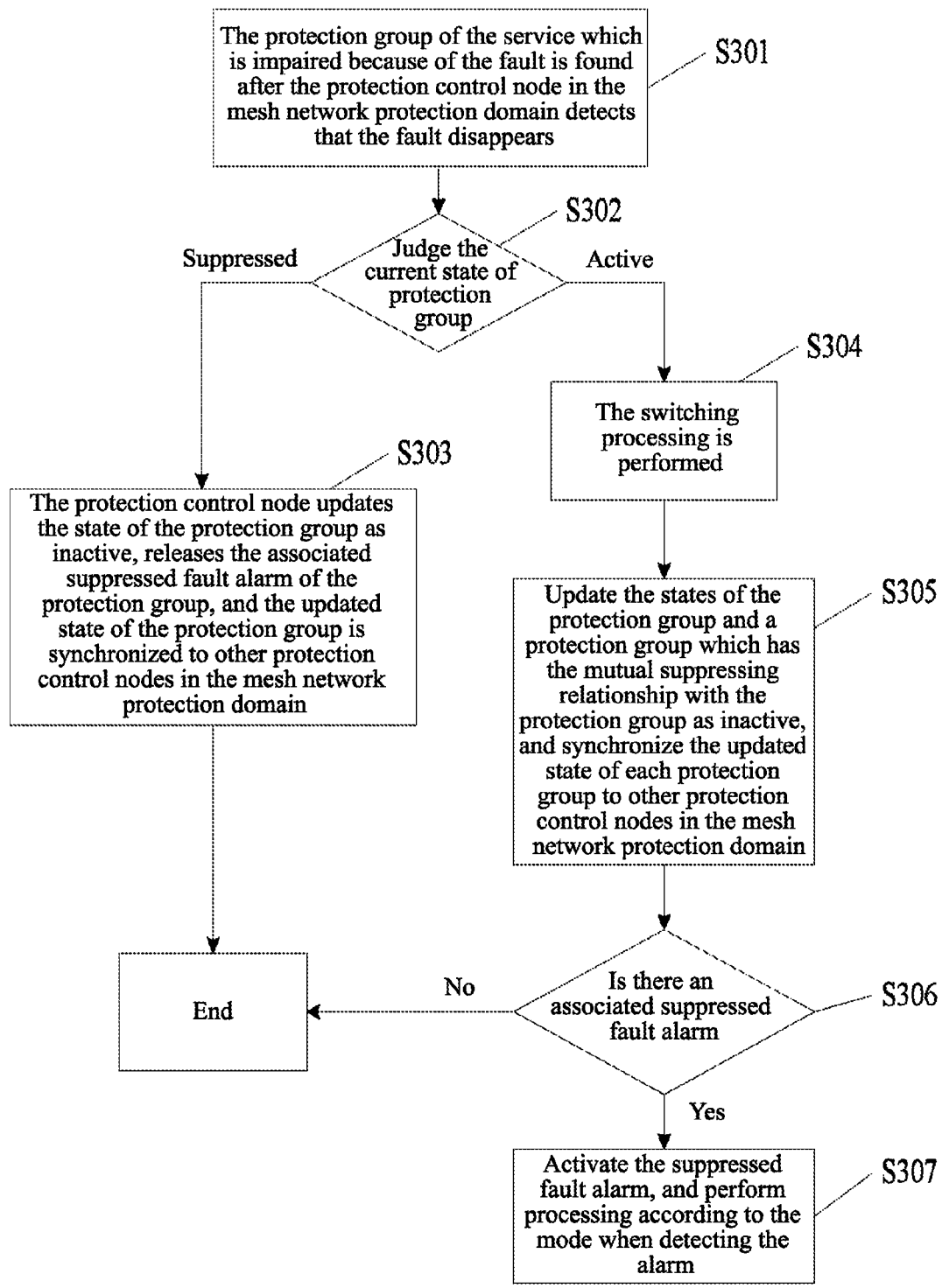
FIG. 13 is a flow chart of triggering a switching processing when detecting a fault disappearance according to embodiment one of the present invention.

When the protection control node of the mesh network protection domain detects the fault disappearance, the triggered process flow is shown in FIG. 13, including the following steps:

in step S301: the protection control node finds the protection group of the service which is impaired previously because of the fault after detecting that the fault disappears;

in step S302, the protection control node judges the current state of the protection group; if it is in the suppressed state, then step S303 is executed; if it is in the active state, then step S304 is executed;

in step S303: the protection control node updates the state of the protection group as inactive, releases the suppressed alarm information of the fault, and synchronizes the updated state of the protection group to other protection control nodes in the mesh network protection domain, and the process ends;

in step S304: the switching processing is performed according to the protection method corresponding to the service, and the service is switched to the working path;

in step S305: after the switching is finished, the protection control node updates the states of the protection group and a protection group which has the mutual suppressing relationship with the protection group as the inactive state, and synchronizes the updated state of each protection group to other protection control nodes in the mesh network protection domain;

in step S305: the protection control node judges whether there is an associated suppressed fault alarm in a protection group which has the mutual suppressing relationship with the protection group; if yes, then step S306 is executed, if not, the process ends;

in step S306: the protection control node activates one suppressed fault alarm, it is processed according to the same way when detecting the fault alarm, and the process ends.

The protection control node can choose to activate the suppressed fault alarm of which the occurrence time is the earliest, and also can choose to activate the suppressed fault alarm of which the priority is the highest.

Since the above-mentioned sharing protection method runs through the nodes of the mesh network protection domain by using one whole ring, and only reserves the protection path on the ring. For the mesh network protection domain with n nodes, supposing the number of the interconnection paths between nodes is M, and $N<=M<=(N^2-N)/2$, so the maximum utilization rate of the network is $(N-1)/(N+1)$.

Corresponding to the above-mentioned method, the system for sharing protection provided by the present embodiment includes a management plane of the mesh network protection domain and various protection control nodes, wherein:

the management plane is configured to preset a protection ring in the mesh network protection domain, determine one loop where there are most services of which source and destination nodes are run through as a path of the protection ring, and only reserve protection resources in the path of the protection ring; and the protection control node includes:

a configuration module, configured to configure a protection method used by the service of which the source and destination nodes are run through by the protection ring and a corresponding protection group, and set protection paths of all the protection groups on the protection ring;

a fault alarm processing module, configured to find the protection group of the service impaired because of a fault when detecting a fault alarm, switch the service to a protection path which is not occupied of the protection group, or suppress the fault alarm; and a fault disappearance processing module, configured to find the protection group of the service impaired because of the fault when detecting that fault disappears, switch the service which has been switched to the protection path back to an working path, or release the suppressed fault alarm of the fault.

Specifically, the configuration module is configured to configure and use a ring sharing protection method for a ring service of which working paths are all on the protection ring, and configure one ring sharing protection group for all ring services, and regard the protection ring as the protection path of the ring sharing protection group; configure and use the 1:1 protection method (it also can be 2:1 protection method in other embodiments) for a string service of which the source and destination nodes are on the protection ring but not all working paths are on the protection ring, and configure one 1:1 protection group (it also can be two in other embodiments) for every string service, and regard one section (or two sections) of paths of the protection ring between the source and destination nodes of the string service as the protection path.

The configuration module is configured to store all protection groups configured for the service of which the source and destination nodes are run through by the protection ring, for every protection group, if there is other protection group which is at least partly coincident with the protection path of the protection group, then record other protection group said above as a protection group suppressed by the protection group, and mark an initial state of each protection group as an inactive state;

the fault alarm processing module is configured to detect the fault alarm, and after finding the protection group of the service impaired because of the fault, if the protection group is currently in a suppressed state (when the service has a plurality of protection groups, it is modified as "if the protection groups of the service are all in the suppressed state"), then record alarm information of the fault; if not, switch the service to the protection path of protection group which is not suppressed according to the protection method used by the service, and after the switching is finished, update a state of the protection group which is not suppressed as an active state, update a state of the protection group suppressed by the protection group as a suppressed state, and synchronize a updated state of each protection group to other protection control nodes in the mesh network protection domain.

The fault disappearance processing module is configured to detect that a fault disappears, and after finding the protection group of the service impaired because of the fault, if the protection group is currently in the suppressed state (when the service has a plurality of protection groups, it is modified as "if the protection groups of the service are all in the suppressed state"), update the state of the protection group (or a plurality of protection groups) as the inactive state, release the alarm information of the fault which is recorded previously, and synchronize the updated state of the protection group to other protection control nodes in the mesh network protection domain; or else, switch the service to the working path according to the protection method used by the service, and after the switching is finished, update the states of the protection group in the active state and a protection group suppressed by the protection group as the inactive state, and synchronize the updated state of each protection group to other protection control nodes in the mesh network protection domain.

The fault disappearance processing module is further configured to, after the service is switched to the working path, judge whether the protection group which is suppressed previously has an associated suppressed fault alarm; if yes, then activate one suppressed fault alarm, and perform processing according to the same way when the fault alarm is detected.

Embodiment Two the processing, when the present embodiment presets a protection ring in the mesh network protection domain, establishes the protection group for the service and detects the fault alarm and the fault disappearance, can adopt the procedures given according to FIG. 4, FIG. 6 and FIG. 13 in the embodiment one. But the network topology which the present embodiment is based on is different, it is one mesh network protection domain with 4 nodes, so the specific configuration and switching will be different.

Figure 14:
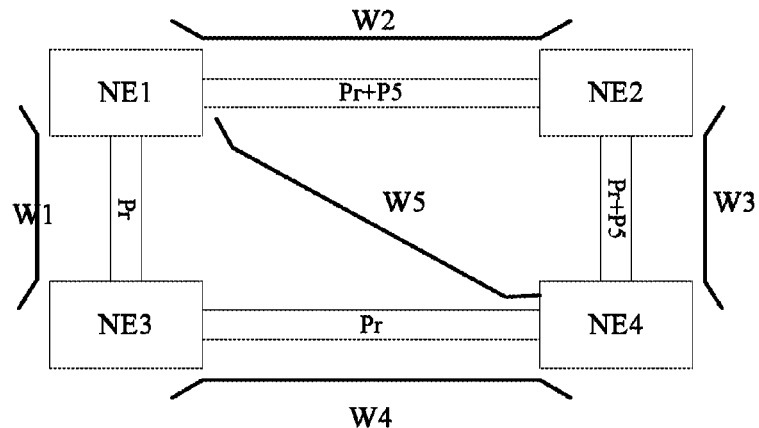
FIG. 14 is a schematic diagram of a network topology, service configuration and protection ring configuration according to embodiment two of the present invention.

As shown in FIG. 14, the mesh network protection domain includes 4 nodes: NE1, NE2, NE3 and NE4, the protection ring is preset in a ring composed of the NE1, the NE2, the NE3 and the NE4, shown as the channel in the figure. In the mesh network, protection needs to be provided for 5 services in total, wherein, W1, W2, W3 and W4 are ring services, and W5 is a string service.

The whole path of the protection ring NE1-NE2-NE4-NE3-NE1 is configured as the ring sharing protection group Pr, and four services share the ring sharing protection group.

The section NE1-NE2-NE4 on the protection ring can be selected and regarded as the protection path of W5 service when the 1:1 protection group of the string service W5 is configured, and the protection paths of the ring sharing protection group Pr and the 1:1 protection group P5 at NE1-NE2 and NE2-NE4 are coincident. Certainly, the section NE1-NE3-NE4 also can be selected and regarded as the protection path of W5 service, and at this moment the ring sharing protection group Pr and the 1:1 protection group P5 still have the coincident parts.

In the protection group suppressing relationship table, the ring sharing protection group Pr is associated with the 1:1 protection group P5, and the mutual suppressing relationship of each protective group is recorded, as shown in table 1 below.

TABLE 1

| Active bit | Protection group | Suppressed protection group | Suppressed unprocessed alarm |
| --- | --- | --- | --- |
| Inactive | Pr | P5 | NULL |
| Inactive | P5 | Pr | NULL |

Figure 15:
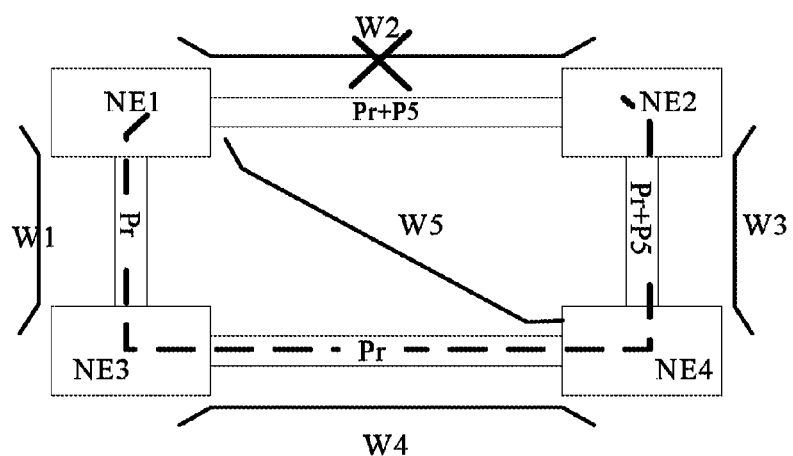
FIG. 15 is a schematic diagram of a switching processing when a single fault of mesh network causes a ring service to be impaired in FIG. 14.

If the single fault occurs at the section NE1-NE2 and causes the ring service W2 to be impaired, as shown in FIG. 15, it will trigger the switching of the ring sharing protection group Pr, and the node detecting the fault alarm, such as NE1 and/or NE2, will switch the service to the protection path NE1-NE3-NE4-NE2 of the ring sharing protection group, as shown by the dash line in the figure, protecting the impaired ring service W2, and then the local protection group suppressing relationship table is updated, and the ring sharing protection group Pr is set as the active state and the 1:1 protection group P5 is set as the suppressed state, which is synchronized to all protection control nodes in the mesh network sharing domain. The updated protection group suppressing relationship table is shown in table 2 below.

TABLE 2

| Active bit | Protection group | Suppressed protection group | Suppressed unprocessed alarm |
| --- | --- | --- | --- |
| Active | Pr | P5 | NULL |
| Suppressed | P5 | Pr | NULL |

Figure 16:
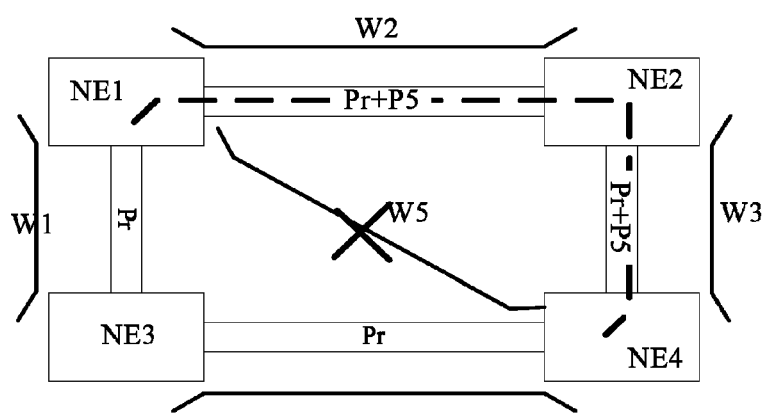
FIG. 16 is a schematic diagram of a switching processing when a single fault of mesh network causes a string service to be impaired in FIG. 14.

If the single fault occurs at the section NE1-NE4 and causes the string service W5 to be impaired, as shown in FIG. 16, it will trigger the switching of the 1:1 protection group P5, and the node detecting the fault alarm, such as NE1 and/or NE4, will switch the service to the protection path of the 1:1 protection group, as shown by the dash line in the figure, protecting the impaired ring service W5, and then the local protection group suppressing relationship table is updated, and the protection group P5 is set as the active state and the Pr is set as the suppressed state, which is synchronized to all protection control nodes in the mesh network sharing domain. The updated protection group suppressing relationship table is shown in table 3 below.

TABLE 3

| Active bit | Protection group | Suppressed protection group | Suppressed unprocessed alarm |
| --- | --- | --- | --- |
| Suppressed | Pr | P5 | NULL |
| Active | P5 | Pr | NULL |

Figure 17:
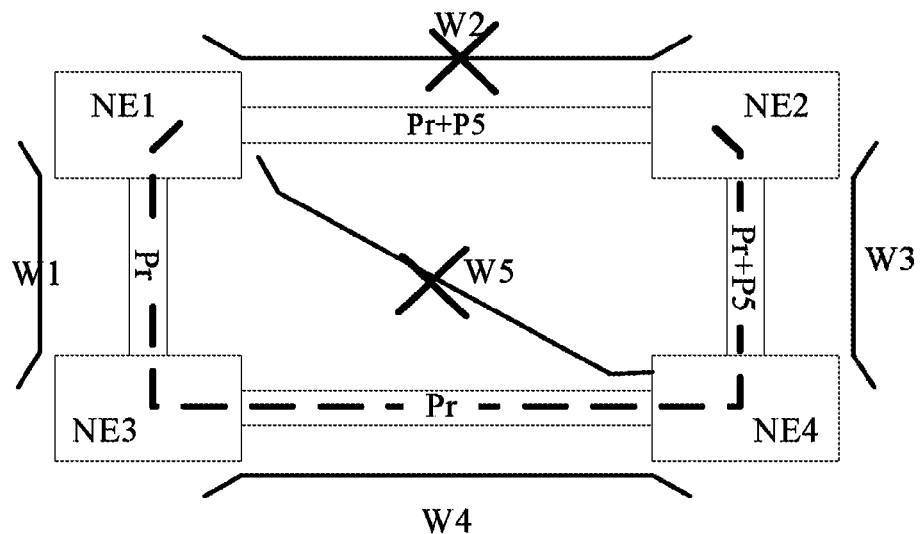
FIG. 17 is a schematic diagram of a switching processing when multiple faults of mesh network cause a plurality of services to be impaired in FIG. 14.
Figure 18:
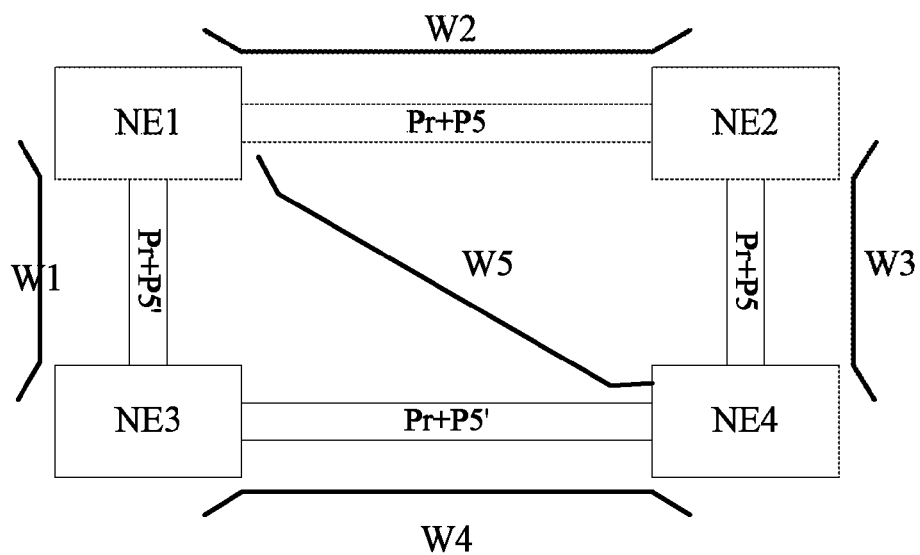
FIG. 18 is a schematic diagram of configuring two protection paths for a string service according to embodiment three of the present invention.

If the first fault occurs at the section NE1-NE2 and causes the ring service W2 to be impaired, it will trigger the switching of the ring sharing protection group Pr and the updating of the state of the protection group, as described hereinbefore. Before the first fault disappears, the second fault occurs at the section NE1-NE4 and causes the string service W5 to be impaired, as shown in FIG. 17. At this moment, since the protection group P5 has already been suppressed by the ring sharing protection group Pr, the node detecting the fault alarm, such as the NE1 and/or node NE4, does not perform the protection switching action, and only records the fault, as shown in table 4 below.

TABLE 4

| Active bit | Protection group | Suppressed protection group | Suppressed unprocessed alarm |
| --- | --- | --- | --- |
| Active | Pr | P5 | NULL |
| Suppressed | P5 | Pr | NE1-NE4 fault |

If the first fault disappears thereafter, it will trigger the protection switching of the ring sharing protection group Pr to return. The node detecting the fault disappearance, such as the NE1 and/or the node NE2, updates the states of the protection group Pr and protection group P5 as inactive, and activates the suppressed second fault alarm and triggers the protection switching of the protection group P5, and after the switching is finished, the local protection group suppressing relationship table is updated, and the protection group P5 is set as the active state, and the protection group Pr is set as the suppressed state, as shown in the Table 3 above, and it also needs to synchronize the updated protection group suppressing relationship table to all protection control nodes in the protection domain.

Embodiment Three

The topology, the preset protection ring and the configured service of the mesh network of the present embodiment is same with that of embodiment two, and also the configuration of the ring service protection group is same with that of embodiment two, and the difference lies in the configuration of the protection group of the string service. In the embodiment one, only one protection path is configured for the string service W5, however in the present embodiment, two 1:1 protection groups can be configured for the string service W5, wherein the first 1:1 protection group P5 regards the path on the section NE1-NE2-NE4 of the protection ring as the protection path, and the second 1:1 protection group P5' regards the path on the section NE1-NE3-NE4 of the protection ring as the protection path.

Accordingly, the configured protection group suppressing relationship table is shown in Table 5 below.

TABLE 5

| Active bit | Protection group | Suppressed protection group | Suppressed unprocessed alarm |
|---|---|---|---|
| Inactive | Pr | P5, P5' | NULL |
| Inactive | P5 | Pr | NULL |
| Inactive | P5 | Pr | NULL |

If the first fault occurs at the section NE1-NE2 and causes the ring service W2 to be impaired, it will trigger the switching of the ring sharing protection group Pr and the updating of the state of the protection group, and the specific processing refers to embodiment two please. Before the first fault disappears, if the second fault occurs at the section NE1-NE4 and causes the string service W5 to be impaired, when searching for the protection group of the W5 service, the node detecting the fault alarm will find that the protection group P5 is suppressed and the protection group P5' is not suppressed, so the protection group P5' is selected and the switching processing is performed according to the 1:1 protection method.

It is easy to understand that the single string service and the multi-string service can adopt this kind of protection method.

In the present embodiment, the protection control node detecting the fault will find two protection groups of the service which is impaired because of the fault, and the service can be switched to the protection path of the protection group so long as any protection group is not in the suppressed state, in other words, the 2:1 protection is provided for the string service W5, which improves the self-healing ability of the multiple faults of the network. While the state of the protection group is updated, it needs to update the state of the protection group after the switching has been performed as active, and update the state of the protection group which is suppressed by it as suppressed. Since the other protection group doesn't perform switching and is not suppressed by the protection group, it will not be updated. If two protection groups are both in the suppressed state, then the alarm information of the fault is recorded and associated with the two protection groups.

When the fault disappears, if the protection control node detecting the fault disappearance finds that the two protection groups of the service which is impaired because of the fault are both in the suppressed state, then it updates the states of the two protection groups as inactive, and releases the alarm information of the fault which is suppressed previously. If it finds that one protection group of the service which is impaired because of the fault is in the active state, then it switches the service back to the working path, updates the state of the protection group as inactive, updates the state of the protection group suppressed by the protection group as inactive, and does not perform the update processing on the state of the other protection group.

It can be seen that the present embodiment needs to perform the switching judgment according to states of two protection groups for the single string service and the multi-string service; however, the update processing of the state of every protection group is coincident with the embodiment one.

Embodiment Four

In the present embodiment, the processing of presetting the protection ring in the mesh network protection domain and configuring the protection group for the ring service is same with that of embodiment one, however, the protection group of the string service is configured as the ring sharing protection group, and its protection path includes the working path of the string service and one section of path of the preset protection ring between the source and destination nodes of the string service, in other words, it is the special case that only one service uses the ring sharing protection group. When the fault occurs and causes the string service to be impaired, the switching processing is performed according to the ring sharing protection method. Others about the configuration, update and synchronization of the suppressing relationship between the protection groups are same with that of the embodiment one.

Comparatively speaking, it is simpler to perform the switching processing on the string service according to the 1:1 or 2:1 protection method, but since each service of the present embodiment shares the protection path on the protection ring, it still has the effect of improving the resource utilization rate.

Similarly, some changes also can be made for the above-mentioned or other embodiments of the present invention, for example, one 1:1 protection group can be configured for each ring service, one section of path of the protection ring which is between the source and destination nodes of the string service and different from the working path of the ring service is regarded as the protection path, and the switching processing is performed according to the 1:1 protection method. The embodiment has the effect of improving the resource utilization rate as well. When there are few ring services, the performance is affected not too much.

The method and system for sharing protection of embodiments in the present invention is one kind of universal method and system for sharing protection of a mesh network protection domain, which is suitable for various types of mesh networks, such as OTN, PTN, SDH, etc.

Through the embodiment of the present invention, the utilization rate of the network resource is improved. For the mesh network with n nodes, the maximum utilization rate of the network is (N−1)/(N+1). For the ring service, the switching processing can be performed on services according to the ring sharing protection method or the 1:1 protection method; for the string service, the switching processing can be performed according to the 1:1 or 2:1 protection method, and the sharing protection method of the mesh network is simplified. Through the processing of the suppressing relationship of the protection group, such as configuring, updating and synchronizing and so on, the services of which the protection paths are coincident can be prevented from interfering with each other during the switching as well, which enables all these services to realize the sharing of the protection path by using a time-sharing mode; in addition, the switching processing can also be performed on multiple faults one by one through recording and activating the suppressed alarm.

It can be understood by those skilled in the art that all or part of the steps in the above-mentioned method of embodiments can be fulfilled by programs instructing the relevant hardware, and the programs can be stored in a computer readable storage medium. When the programs are performed, one of the steps of the above method embodiments or their combination is included.

In addition, each function unit in the each embodiment of the present invention can be implemented in the form of hardware, and also can be implemented in the form of software function module. If it is implemented in the form of the software function module and sold or used as an individual product, it also can be stored in a computer readable storage medium such as a read only memory, a magnetic disk or an optical disk, etc.

The above description is only specific embodiments of the present invention, and it is not intended to limit the protective scope of the present invention. Those skilled in the art can think of the replacements and variations easily within the technical scope disclosed by the present invention, all of which should be included in the protective scope of the present invention. Therefore, the protective scope of the present invention should be based on the protective scope of the claims.

What we claim is:

1. A method for sharing protection of a mesh network protection domain, comprising:
   presetting a protection ring in the mesh network protection domain, a path of the protection ring running through source and destination nodes of a plurality of services in the mesh network protection domain, and only reserving protection resources in the path of the protection ring; and
   configuring corresponding protection groups for each service;
   the corresponding protection groups respectively selecting a protection method for each service; and
   setting protection paths for all the protection groups on the protection ring;
   wherein when a fault occurs in the mesh network protection domain and causes that a service is impaired, if the protection path of the service is not occupied by other services, a switching processing is performed according to the protection method used by the service; or
   if the protection path of a service is occupied by other services, alarm information of the fault is recorded, and the switching processing is performed according to the protection method used by the service only when the protection path of the service turns to be idle and the fault hasn't disappeared yet.

2. The method according to claim 1, wherein,
   when presetting the protection ring in the mesh network protection domain, determining a path for the protection ring, wherein the path refers to one loop which runs through the most source and destination nodes.

3. The method according to claim 2, wherein,
   when configuring corresponding protection groups for each service and the protection groups respectively select a protection method for each service, the 1:1 or 2:1 protection method is utilized for a string service of which the source and destination nodes are on the protection ring but not all working paths are on the protection ring, and one or two 1:1 protection groups are configured for every string service, and one or two sections of paths of the protection ring between the source and destination nodes of the string service is regarded as the protection path.

4. The method according to claim 2, wherein,
   when configuring corresponding protection groups for each service and the protection groups respectively select a protection method for each service, a mutual suppressing relationship between various protection groups is configured according to a following way: for every protection group, if there is other protection group which is at least partly coincident with the protection path of the protection group, recording other protection group as a protection group suppressed by the protection group; and
   synchronizing all configured protection groups and information of the mutual suppressing relationship between various protection groups to all protection control nodes in the mesh network protection domain, and marking an initial state of each protection group as an inactive state.

5. The method according to claim 1, wherein,
   when configuring corresponding protection groups for each service and the protection groups respectively select a protection method for each service, a ring sharing protection method is utilized for a ring service of which working paths are all on the protection ring, and one ring sharing protection group is configured for all ring services, and the protection ring is regarded as the protection path of the ring sharing protection group; or
   when configuring corresponding protection groups for each service and the protection groups respectively select a protection method for each service, a 1:1 protection method is utilized for a ring service of which working paths are all on the protection ring, and one 1:1 protection group is configured for every one ring service, and a section of path of the protection ring different from the working path of the ring service between the source and destination nodes of the ring service is regarded as the protection path.

6. The method according to claim 5, wherein,
   when configuring corresponding protection groups for each service and the protection groups respectively select a protection method for each service, the 1:1 or 2:1 protection method is utilized for a string service of which the source and destination nodes are on the protection ring but not all working paths are on the protection ring, and one or two 1:1 protection groups are configured for every string service, and one or two sections of paths of the protection ring between the source and destination nodes of the string service is regarded as the protection path.

7. The method according to claim 5, wherein,
   when configuring corresponding protection groups for each service and the protection groups respectively select a protection method for each service, a mutual suppressing relationship between various protection groups is configured according to the following way: for every protection group, if protection paths of a protection group at least partly overlaps with protection paths of other protection groups, recording other protection groups as protection groups suppressed by the protection group; and
   synchronizing all configured protection groups and information of the mutual suppressing relationship between various protection groups to all protection control nodes in the mesh network protection domain, and marking an initial state of each protection group as an inactive state.

8. The method according claim 1, wherein,
when configuring corresponding protection groups for each service and the protection groups respectively select a protection method for each service, the 1:1 or 2:1 protection method is utilized for a string service of which the source and destination nodes are on the protection ring but not all working paths are on the protection ring, and one or two 1:1 protection groups are configured for every string service, and one or two sections of paths of the protection ring between the source and destination nodes of the string service is regarded as the protection path.

9. The method according to claim 8, wherein the string service comprises at least one of following services:
a single string service, referring to a string service of which the source and destination nodes are on the protection ring and all working paths are not on the protection ring, wherein the single string service uses the 1:1 or 2:1 protection method;
a multi-string service, referring to a string service of which the source and destination nodes and a relay node are all on the protection ring and all the working paths are not on the protection ring, wherein the multi-string service uses the 1:1 or 2:1 protection method; and
an across-ring string service, referring to a string service of which the source and destination nodes are on the protection ring and a part of the working paths are on the protection ring and another part of the working paths are not on the protection ring, wherein the across-ring string service uses the 1:1 protection method.

10. The method according to claim 1, wherein,
when configuring corresponding protection groups for each service, a mutual suppressing relationship between various protection groups is configured according to the following way: for each one protection group, if protection paths of a protection group at least partly overlaps with protection paths of other protection groups, recording other protection groups as protection groups suppressed by the protection group; and
synchronizing all configured protection groups and information of the mutual suppressing relationship between various protection groups to all protection control nodes in the mesh network protection domain, and marking an initial state of each protection group as an inactive state.

11. The method according to claim 10, wherein when the mesh network protection domain is faulted, a process flow of triggering comprises:
after the protection control node in the mesh network protection domain detects a fault alarm, finding a protection group of a service impaired, and judging whether the protection group is currently in a suppressed state:
if yes, the protection control node recording alarm information of the fault, and performing suppression on the fault alarm; and
if not, switching the service to the protection path of one protection group which is not suppressed according to the protection method used by the service, and after switching is finished, the protection control node updating a state of the protection group as an active state, updating a state of the protection group suppressed by the protection group as the suppressed state, and synchronizing an updated state of each protection group to other protection control nodes in the mesh network protection domain.

12. The method according to claim 11, wherein, when the fault of the mesh network protection domain disappears, the process flow of triggering comprises:
after the protection control node in the mesh network protection domain detects that the fault disappears, finding the protection group of the service impaired, and judging whether the protection group is currently in the suppressed state:
if yes, the protection control node updating the state of the protection group as the inactive state, releasing the alarm information of the fault which is previously recorded, and synchronizing the updated state of the protection group to other protection control nodes in the mesh network protection domain; and
if not, there being one protection group which is in the active state in the protection group, and switching the service to the working path according to the protection method used by the service, and after switching is finished, the protection control node updating states of the protection group in the active state and a protection group suppressed by the protection group as the inactive state, and synchronizing the updated state of each protection group to other protection control nodes in the mesh network protection domain.

13. The method according to claim 12, wherein,
in a process flow of triggering a fault disappearance in the mesh network protection domain, if at least one of the protection groups of services impaired due to the fault is in the active state, the protection control node which detects the fault disappearance, after the service is switched to the working path, judges whether a protection group which is previously suppressed has an associated suppressed fault alarm; if yes, the protection control node activates one suppressed fault alarm, and processing is performed according to the same way when the fault alarm is detected.

14. The method according to claim 1, wherein, when configuring corresponding protection for each service and the protection groups respectively select a protection method for each service a plurality of services said above, a mutual suppressing relationship between various protection groups is configured according to the following way: for each one protection group, if protection paths of a protection group at least partly overlaps with protection paths of other protection groups there is other protection group which is at least partly coincident with the protection path of the protection group, recording other protection as protection suppressed by the protection group; and synchronizing all configured protection groups and information of the mutual suppressing relationship between various protection groups to all protection control nodes in the mesh network protection domain, and marking an initial state of each protection group as an inactive state.

15. A system for sharing protection of a mesh network protection domain, comprising a management plane of the mesh network protection domain and various protection control nodes, characterized in that:
the management plane is configured to preset a protection ring in the mesh network protection domain, determine a path for the protection ring, wherein the path refers to one loop which runs through the most source and destination nodes, and only reserve protection resources in the path of the protection ring; and
the protection control node comprises a configuration module, a fault alarm processing module and fault disappearance processing module;
the configuration module is configured to configure corresponding protection groups for each service, the corresponding protection groups respectively select a protection method for each service, and set protection paths for all protection groups on the protection ring; the configuration module is further configured to store all protection groups configured for the service of which the source and destination nodes are run through by the protection ring, for every protection group, if there is other protection group which is at least partly coincident with the protection path of the protection group, then record other protection group said above as a protection group suppressed by the protection group, and mark an initial state of each protection group as an inactive state;

the fault alarm processing module is configured to find a protection group of a service impaired because of a fault when detecting a fault alarm, switch the service to the protection path which is not occupied by the protection group, or suppress the fault alarm; and a fault disappearance processing module, configured to find the protection group of the service impaired when detecting that the fault disappears, switch the service which has been switched to the protection path back to a working path, or release the suppressed fault alarm of the fault; the fault alarm processing module is further configured to detect a fault alarm, and after finding the protection group of the service impaired, judge whether the protection group is currently in a suppressed state; if yes, then record alarm information of the fault; if not, switch the service to the protection path of a protection group which is not suppressed according to the protection method used by the service, and after switching is finished, update a state of the protection group as an active state, update a state of the protection group suppressed by the protection group as the suppressed state, and synchronize a updated state of each protection group to other protection control nodes in the mesh network protection domain; and the fault disappearance processing module is configured to detect that the fault disappears, and after finding the protection group of the service impaired, if the protection group is currently in the suppressed state, update the state of the protection group as the inactive state, release the alarm information of the fault which is previously recorded, and synchronize the updated state of the protection group to other protection control nodes in the mesh network protection domain; or else, switch the service to the working path according to the protection method used by the service, and after switching is finished, update states of the protection group in the active state and a protection group suppressed by the protection group in the protection group as the inactive state, and synchronize the updated state of each protection group to other protection control nodes.

16. The system according to claim 15, wherein, the configuration module is configured to configure and use a ring sharing protection method for a ring service of which working paths are all on the protection ring, and configure one ring sharing protection group for all ring services, and regard the protection ring as the protection path of the ring sharing protection group; configure and use a 1:1 or 2:1 protection method for a string service of which the source and destination nodes are on the protection ring but not all working paths are on the protection ring, and configure one or two 1:1 protection groups for every string service, and regard one or two sections of paths of the protection ring between the source and destination nodes of the string service as the protection path.

17. The system according to claim 15, wherein, the fault disappearance processing module is further configured to, after the service is switched to the working path, judge whether the protection group which is suppressed previously has an associated suppressed fault alarm; if yes, then activate one suppressed fault alarm, and perform processing according to the same way when the fault alarm is detected.

* * * * *